Jan. 22, 1963

H. F. WAHL 3,074,190

REAR-MOUNTED RIPPER

Filed June 16, 1960

3 Sheets-Sheet 1

INVENTOR.
Harold F. Wahl,
BY
Dawson, Tilton & Graham,
ATTORNEYS.

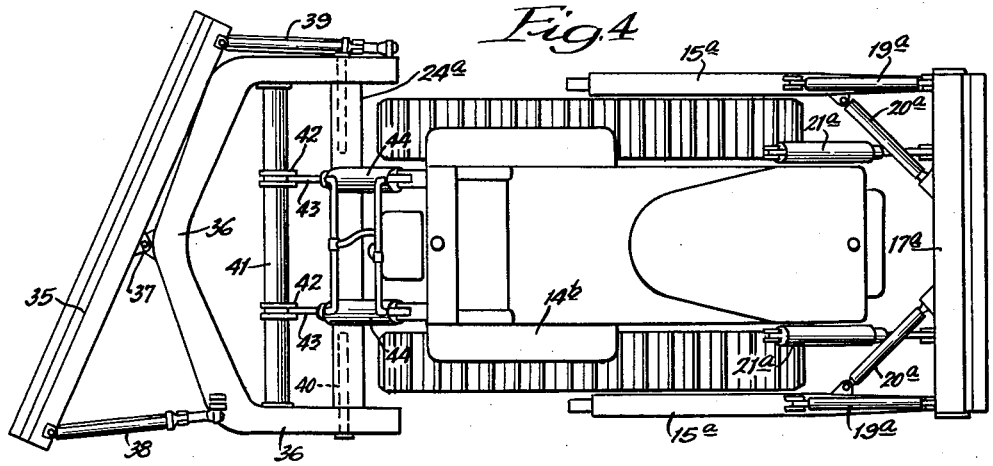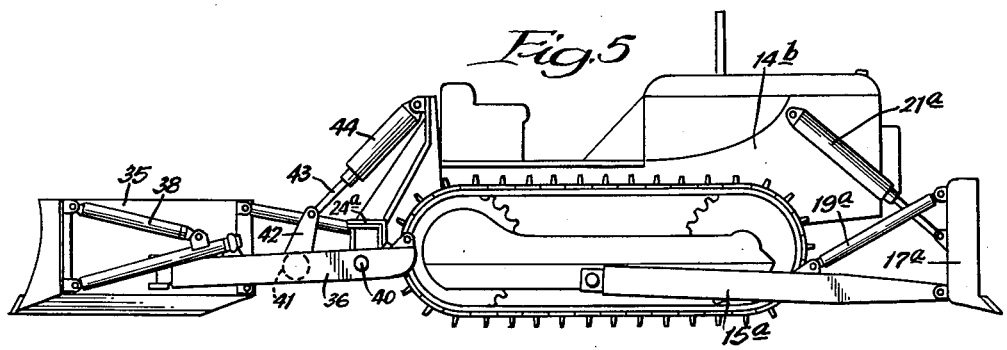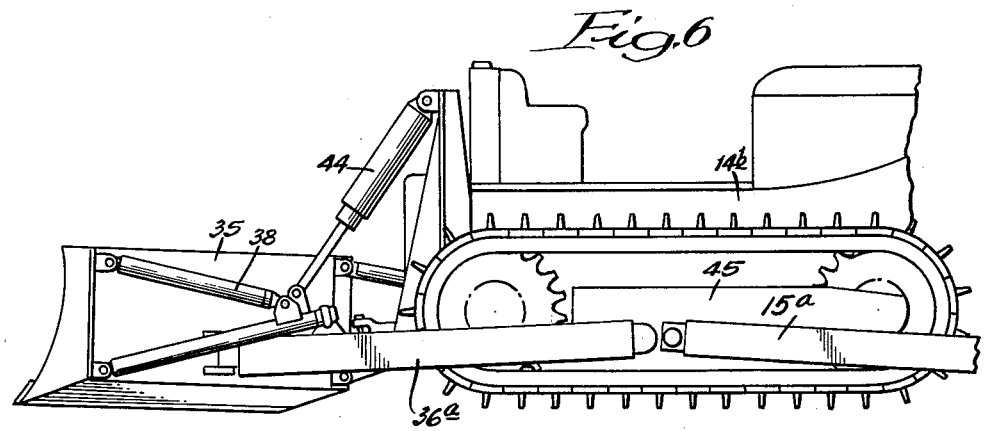

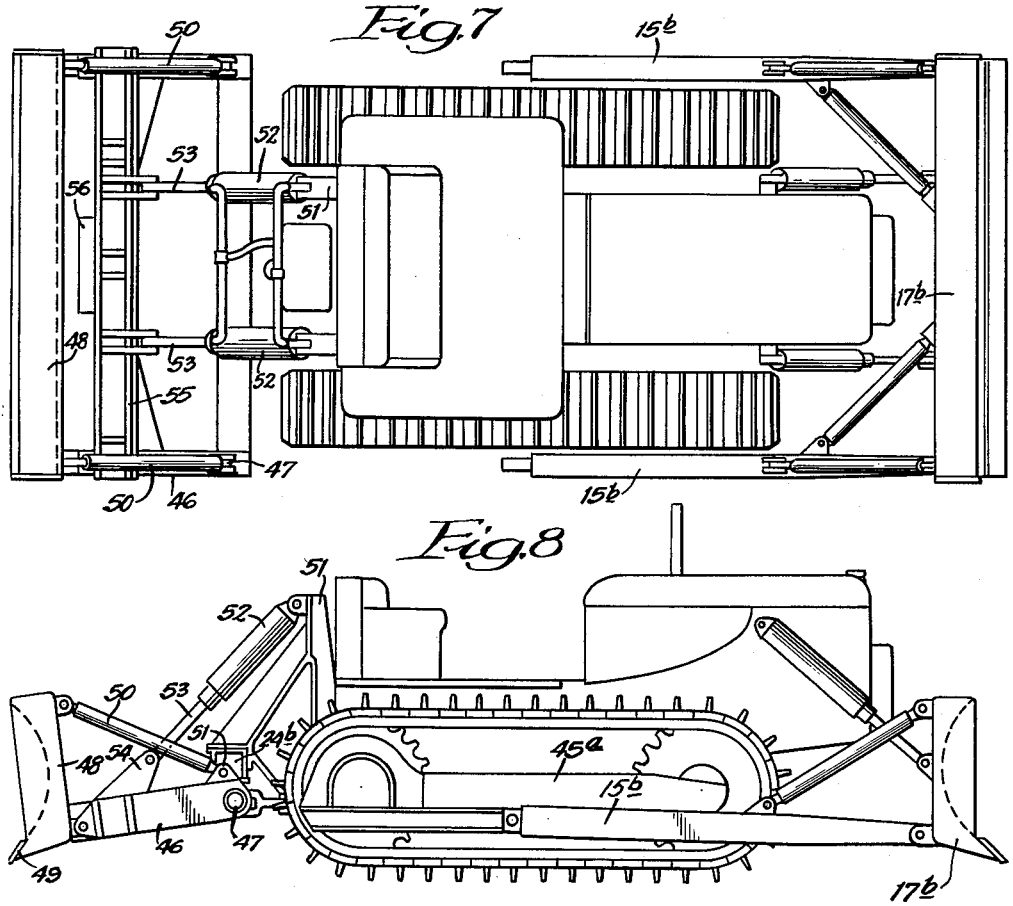

United States Patent Office 3,074,190
Patented Jan. 22, 1963

3,074,190
REAR-MOUNTED RIPPER
Harold F. Wahl, 2815 NE. 32nd Place, Portland, Oreg.
Filed June 16, 1960, Ser. No. 36,680
2 Claims. (Cl. 37—145)

This application is a continuation-in-part of application Serial No. 573,794, filed March 26, 1956 and now abandoned. This invention relates to a rear-mounted ripper and, more particularly, to a tractor equipped with earth working elements at the rear end thereof adapted to rip ground upon rearward tractor movement.

Although tractors equipped with earth working tools have been known and used for a long time, those skilled in this art have approached very gingerly the development of mounting ground working tools both fore and aft on the tractor. For one thing, the tractor was conceived of to have been designed for essentially forward operation and an undesirable imbalance might result from employing the tractor in a fashion different from that for which it was designed. Also, the tractor was conceived of as a versatile instrument, capable of being equipped with a variety of tools, and this versatility was thought to be hampered by the provision of a specific implement at the rear end, for example.

In strong contrast to this, I have found that exceptional operational advantages flow from the rear mounting of a ripper, particularly for movement of the tractor in the rearward direction. Further, I have found that the desirable versatility of the tractor is even enhanced through this type of equipment, particularly through the use of novel pusher arms capable of selective mounting of different earth working tools.

An object of the present invention is to provide a tractor equipped with a rear mounted ground ripping tool arranged for ripping during rearward tractor movement. Another object is to provide a basic push arm design for ripper teeth, but so arranged that it will make a workable mounting for excavating tractor tools normally mounted on the front of a tractor. Other objects and advantages may be seen in the details of construction and operation as set down in this specification.

The invention is shown, in illustrative embodiments, by the accompanying drawings, in which—

Figure 1:
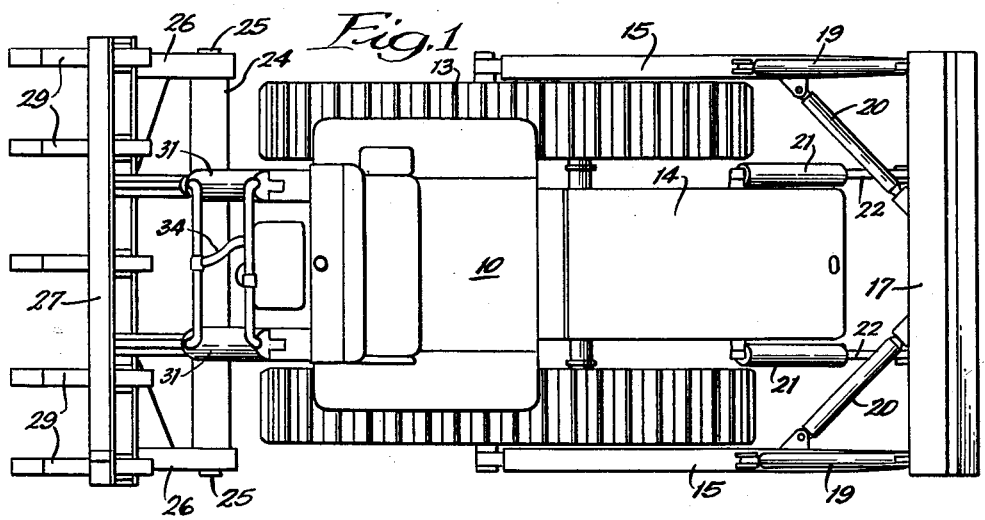
Figure 2:
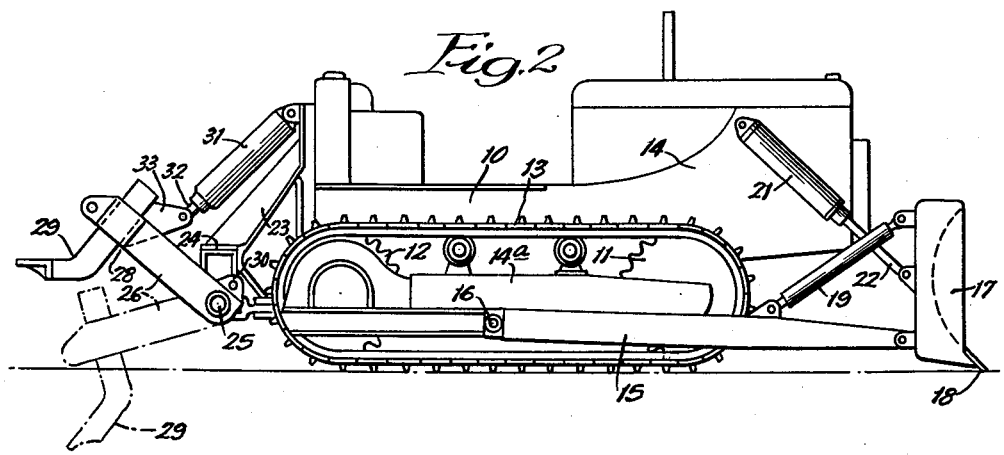
Figure 3:
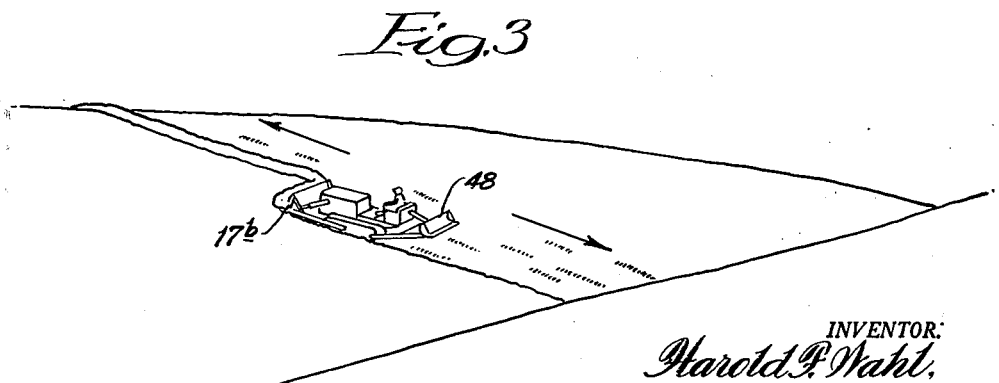

FIGURE 1 is a top plan view of a tractor equipped with push elements at opposite ends of the tractor; FIG. 2, a side view in elevation of the structure shown in FIG. 1; FIG. 3, a perspective view showing the operation of the two-way tractor on a hillside; FIG. 4, a top plan view of a modified form of structure in which an inclined pusher blade is supported at the rear of the tractor and a straight blade supported at the front of the tractor; FIG. 5, a side view in elevation of the structure shown in FIG. 4; FIG. 6, a view similar to FIG. 5, but showing the blade structure mounted upon a pusher arm pivotally mounted between the front and rear track sprockets; FIG. 7, a top plan view of the tractor seen in FIG. 1 but in which the rear pusher arms are equipped with a dozer blade rather than a rear ripper; and FIG. 8, a side view in elevation of the structure shown in FIG. 7.

In the illustration given in FIGS. 1 and 2, 10 designates a tractor equipped with a front track sprocket 11 and a rear track sprocket 12 and on which is mounted the segmental elements 13. The main frame of the tractor is designated generally by the numeral 14.

Normally, the tractor is equipped on its forward side with push arms 15 which are pivotally mounted at their inner ends by a pivot 16 upon the frame portion or trunnion support 14a extending between sprockets 11 and 12. Normally, the push arms 15 are pivotally connected at their forward ends to a blade 17 having a cutting edge 18. Each of the push arms 15 is connected to the top portion of the blade 17 by tilt braces 19 and diagonal braces 20 extending between the arms and the blade 17, as shown best in FIG. 1. The push arms are lowered and raised by means of power cylinders 21 equipped with pistons (not shown) connected to piston rods 22.

In the practice of my invention, I provide a mounting or support means by which pusher elements such as rippers, blades, or other means, are supported upon the rear portion of the tractor and I employ hydraulic cylinder and piston rod units for raising and lowering such elements. In the illustration given in FIGS. 1 and 2, I secure to the rear portion of the frame 14 a depending bracket 23 supporting a crossbeam 24 and in the crossbeam rotatably secure shafts 25 on which are mounted short pusher arms 26. In the illustration given in FIGS. 1 and 2, the pusher arms 26 support a crossbar 27 equipped with sockets 28 receiving ripper teeth 29. The ripper teeth 29 may be fixed within the sockets 28, but I prefer to have them slidably received therein and selectively secured at different elevations by the use of bolts or other means. Further, if desired, the ripper teeth 25 may be turned in the opposite direction from the showing in FIG. 2. It is found, however, that a better job of ripping can be done if the ripper is pushed, and there is an advantage in having the structure as shown in FIG. 2, where the rippers are operated in the direct line of vision of the operator as the tractor moves in a rearward direction.

In the structure shown, the pusher arms 26 are preferably provided at their inner side with a tilting brace bracket or upstanding lug 30, apertured to receive a tilting brace, to accommodate the element mounting seen in FIGS. 7 and 8.

To raise and lower the crossbar 27 and the ripper teeth 29 or other elements carried thereby, I employ power cylinders 31 equipped with piston rods 32 pivotally secured to brackets 33 mounted upon the cross-arm 27. Pressure fluid pipes 34 are provided with suitable valves for controlling the flow of pressure fluid to either side of the double-acting pistons to effect upward and downward movement of the crossbar 27 and the elements carried thereby.

It will be understood that a great variety of tools such as brush rakes, rock rakes and other working tools, may be introduced into the ripper pusher structure shown. In fact, when the ripper teeth 29 are lowered to a position adjacent the ground, they form, in effect, a brush rate and, of course, brush rakes of a conventional design may be substituted to provide the raking effect desired.

In the operation of the structure shown in FIGS. 1 and 2, the tractor may be operated for pushing in either or both directions, certain work being accomplished during a forward movement of the tractor and other work being accomplished during the rearward movement of the tractor. In the rearward movement of the tractor, the ripper elements 29 may be caused to tear up the earth over which the tractor is moving, and then, in the forward movement, the blade 17 may be caused to level out or otherwise work the newly-turned soil. The operation of the two independently mounted end pusher elements directly affects the operation of the other elements. For example, when the blade 17 is being operated over a ditch, the rear-mounted ripper teeth 29 may be employed as a brake and counterbalance. Similarly, when the ripper is being operated against extremely difficult soil, the pusher arms 15 at the forward end of the tractor may be raised to throw all of the weight possible upon the tractive elements to provide the necessary traction. At other times, it may be better to lower the blade 17 to reduce the traction on one portion of the track members 13, particularly where light ripping movement with the teeth 29 is desired, as, for example, when ripping is on an upwardly-extending slope. Further, the employment of the pusher elements at opposite ends of the tractor permits greater maneuverability of the crawler type of tractor. With tools mounted fore and aft of the tractor, the amount of maneuvering during any job cycle is greatly reduced. For example, when the ripper teeth are mounted on a short push arm 26, this permits rapid vertical traverse in and out of the ground for the purpose of quickly maneuvering the tractor without ground resistance caused by the tools and for immediate tool operation in either direction without turning the tractor around.

As seen in FIGS. 1 and 2, the crossbeam 24, which, with the pusher arms 26, provides a frame for the mounting of the back ripper, is mounted on the rear portion of the tractor frame 14, i.e., rearward of the treads or segmental elements 13. In such a situation, the pusher arms are under compression which can be transmitted to and distributed over the tractor frame 14. On the other hand, where a rear-mounted tool is oriented for work only when the tractor moves forwardly, the pusher arms are under tension, any stud or bolt securing the tool frame (i.e., elements 24—26) is also under tension and, unless the entire machine is over-engineered, is liable to fail under such strain.

When the inventive machine is operated in a ripping-operation achieved during rearward tractor movement, better results are obtained particularly in sandy soil than with a ripper mounted on a tractor rear and oriented to work only upon forward tractor movement. In the inventive arrangement, the subsequent tread movement over the soil results in a desirable recompacting. The ripped recompacted soil generates a better column action in the scraper bowl so that more earth can be loaded in a single pass of a scraper or other like excavating machine.

In the modification shown in FIGS. 4 and 5, the structure is very similar to that already described in FIGS. 1 and 2 except that at the rear of the tractor there is mounted an angling blade 35. The angling blade 35 is mounted upon a C-frame or push arm 36, having a pivotal connection 37 at its center with the blade and having adjustment braces 38 and 39 for supporting the blade in the desired angular position. The pusher arm or arms 36 are mounted upon shafts 40 supported within the crossbeams 24a, which in turn is supported upon the rear side of the frame 14b. The C-shaped frame or arm 36 is connected centrally with a cross-shaft 41, and the crossbar 41 has upwardly-extending flanges 42 pivotally connected to the piston stems 43 of the power cylinders 44.

At the other end of the frame 14b is mounted a straight blade 17a similar to that described heretofore in connection with FIGS. 1 and 2.

In the modification shown in FIG. 6, the C-frame or push arms 36a, instead of being mounted as shown in FIGS. 4 and 5 on the forward beam 24a, are now mounted upon the push arm support 45 adjacent the point where the forwardly extending push arms 15a are mounted. In the structure shown in FIG. 6, the push arm 36a is relatively long, while in the structure shown in FIG. 4, it is relatively short and begins at the rear of the vehicle.

However, in the basis short arm structure, particularly that of FIGS. 1 and 2, effective counterbalance and braking action is effected in the operation of the tractor. The center of gravity of the average tractor between tools can be considered as about halfway between the front and rear track sprockets. Actually, its location is about three to seven inches closer to the rear sprocket. The vertical location of the center of gravity above the ground is approximately at the track rail of that upper portion of the track farthest from the ground. The effect of rear mounting the rear ripper-equipped push arms is to re-establish or maintain the approximate original center of gravity of the bare tractor. As a result, the tractor is more stable fore, aft and sidewise than would be a tractor carrying only a single tool. Secondly, the increased weight on the ground, because of the combination, increases the tractive effort or tractor pull. As with all vehicles, tractive effort is directly proportional to vehicle weight, and it is also a direct function of the co-efficient of ground friction. This is independent of the direction of travel.

In the modification shown in FIGS. 7 and 8, I mount upon the rearwardly-extending bracket beam 24b a pair of short push arms 46 (identical to the arms 26 in FIGS. 1 and 2) mounted on shafts 47 journaled within the crossbeam 24b, and the arms 46 support a rearwardly extending blade 48 provided with a cutting edge or dozer bit 49. The blade 48 is provided with braces 50 which extend between the blade 48 and brackets 51 (identical to brackets 30 in FIGS. 1 and 2) carried on the push arm 46. Power cylinders 52 are provided with piston rods 53 engaging brackets 54 fixed to the cross-arm 55 interposed between push arms 46 for raising and lowering the push arms. A thrust pad 56 may be attached to the cross-arm 55 as shown in FIG. 7. The blade 17b carried by the forward push arms 15b are thus opposed to the straight blade 48 carried on the rearwardly-extending push arms 46. Instead of connecting the forward pusher arms 15b to the support 45a, a front end structure corresponding to the rear arm structure may be employed.

The operation of the structure is illustrated in FIG. 3, showing a seesaw action of the tractor in operation along the side of a hill. Such seesaw action is also effective as the tractor moves across a ditch for moving dirt into the ditch. Thus the oppositely-disposed working elements on the tractor cooperate in producing a result which has never heretofore been accomplished by a single tractor, and one which could not be accomplished effectively with two tractors operating separately. The two tools become an effective brake on each other in either direction. There is a particular advantage in having the two-tool combination in cutting the crown on a ridge or on steep slopes, and the structure involves safety and workability.

In all of the foregoing operations, it is found that the tractor is utilized in substantially every inch of movement, whether in a forward or rearward direction, doing useful work as it moves, and further, the pushing value of the tractor, which represents its best effort and which insures the best ripping or working job, is utilized. At the same time, the operator is positioned close to the rearwardly mounted tools so that he has excellent visibility with respect to these and can effectively control the depth of ripping or other action.

As a result of the combination described in the foregoing drawings and modifications, the tractor is converted into a tool having advantages and capabilities far beyond the mere added advantages of the two tool elements. One tool, such as a blade or ripper, may be employed to directly affect the action of the other blade, ripper, rake, angling blade, etc., so that the weight at either end may be varied and the angles of the working tools at the different ends may be varied, while at the same time the tools at either end may be lowered into ground contact for any desired braking action or support to facilitate turning of the tractor, etc. The advantages following from the cooperative action of the tools on either end of the tractor will not be herein enumerated, but it will be obvious to those skilled in the art that considerable variation in the operation of the tractor as an earth-working means can now be brought about through the cooperative action of the independently-movable elements at the opposite ends of the tractor. In the employment of such devices, it will be understood that any of the attachments employed with tractors may be utilized in the operation heretofore described, including not only rock rakes, brush rakes, rippers, straight and angling blades, and a number of other structures.

While the invention has been described herein in connection with a crawler type of tractor in which segmental track elements are carried on spaced-apart sprockets, it will be understood that the invention is also applicable to other forms of tractors such as heavy four-wheel-tired tractors and with other forms of tractors.

In all of the foregoing structures, the tractor is equipped with tools both fore and aft, and these tools, being mounted on pivotally-supported arms, are manipulated each to affect the operation of the partner tool. This permits the maximum tractive effort because the superimposed weight is maximum. Further, the bare tractor center of gravity weight distribution which is considered about ideal is maintained when tools are mounted both fore and aft at the same time. In other words, if one wants maximum tractive effort, the tool is carried out of the ground while the partner fore and aft tool digs. If minimum tractive effort or redistributed ground pressure, is desired, the tool in question is lowered so that minimum tractive effort is provided with respect to the partner operating tool. If, by way of example, the tractor is stationary and both tools are then forced forward, it is conceivable that all of the tractor could be lifted off the ground and the entire weight of the combination be carried by the tools; then no weight would be carried by the tracks and the tractive effort would be zero. In normal operation, the operator can provide the desired tractive effort for the forward tool by lowering the rear tool, for example, upon the ground so that a minimum tractive effort is provided, while if increased tractive effort is desired, the rear tool may be raised to a point slightly above the ground for maximum tractive effort and then upwardly toward a vertical position for decreasing degree of tractive effort. When the rear tool is the working tool, the forward tool can be manipulated in the same manner for providing minimum and maximum tractive effort and gradations therebetween.

From the foregoing, essentially from a comparison of FIGS. 2 and 8, it will be seen that a very desirable versatility in a tool equipped tractor operation is afforded through the push arms 26 (alternatively 46 in FIG. 8). These arms are pivotally mounted adjacent one end to the tractor frame and at that end carry a pivot coupling means in the form of brackets 30 or 51, as the case may be. The end of each pusher arm remote from the tractor frame is equipped with a pivotal mounting for the securement of a dozer blade if the same is desired (see FIGS. 7 and 8) or with means for supporting the crossbar 27. Irrespective of the tool that is interconnected between the remote ends of the pusher arms, there is provided a convenient pivotal coupling for the connection of a hydraulic cylinder and piston rod unit. Thus, an entire family of tools can be readily mounted between the push arm for utilizing the effective rearward tractor movement in a ground working operation.

Even where the fore and aft tools are identical, and here it will be appreciated that pusher arms such as those provided on the rear of the tractor seen in FIGS. 2 and 8 can be provided at the forward end thereof, the tool-equipped tractor may be advantageously employed where the traverse in one direction is on a different incline than in the reverse direction. An operational advantage accrues from the fact that even with the same elements mounted fore and aft, the displacement of the center of gravity of the tractor may make the rearward movement much more effective. In the past, such an operation could not be realized because of the limitations imposed on the operation of the tractor through the mounting on the rear of a specific tool. With the inventive rear frame, including the crossbar and pusher arms, an entire family of tools may be mounted thereon, and importantly a ripper for extraordinarily effective ripping during rearward movement of the tractor.

While, in the foregoing specification, I have set forth in detail structures illustrative of my invention, it will be understood that such details of structure may be varied widely by those skilled in the art without departing from the spirit of my invention.

I claim:

1. In ground-working equipment, (A) a tractor,
      (i) aligned front and rear sprockets on each side of said tractor adapted to engage continuous tracks to propel the tractor over the ground,
      (ii) said tractor having a center of gravity between said front and rear sprockets and adjacent said rear sprockets,
   (B) a forwardly-extending frame on said tractor, said frame including
      (i) a pair of push arms each pivotally mounted on said tractor at the rear end thereof,
      (ii) a dozer blade pivotally mounted on said arms at the forward ends thereof for dozing action upon forward tractor movement,
      (iii) a brace bar pivotally and diagonally interconnected between said arms and said dozer blade,
      (iv) a cylinder and piston rod unit pivotally interconnected between said dozer blade and tractor to vary the inclination of said blade, and
   (C) a rearwardly-extending bracket on said tractor, said bracket including
      (i) an elongated beam connected to said tractor rearwardly of said rear sprockets and extending transversely of said tractor,
      (ii) a pair of bracket push arms each pivotally mounted on said beam at the forward arm end,
      (iii) a cross bar extending between said bracket arms at the rearward arm ends,
      (iv) a plurality of ripper teeth mounted in said cross bar for ripper action upon rearward tractor movement, and
      (v) a cylinder and piston rod unit pivotally interconnected between said cross bar and said bracket to vary the degree of ground penetration of said ripper teeth.

2. In ground-working equipment, (A) a tractor,
      (i) aligned front and rear sprockets on each side of said tractor adapted to engage continuous tracks to propel the tractor over the ground,
      (ii) said tractor having a center of gravity between said front and rear sprockets and adjacent said rear sprockets,
   (B) a forwardly-extending frame on said tractor, said frame including
      (i) a pair of push arms each pivotally mounted on said tractor at the rear end thereof,
      (ii) a dozer blade pivotally mounted on said arms at the forward ends thereof for dozing action upon forward tractor movement,
      (iii) a brace bar pivotally and diagonally interconnected between said arms and said dozer blade,
      (iv) a cylinder and piston rod unit pivotally interconnected between said dozer blade and tractor to vary the inclination of said blade, and
   (C) a rearwardly-extending bracket on said tractor, said bracket including
      (i) an elongated beam connected to said tractor rearwardly of said rear sprockets and extending transversely of said tractor,
      (ii) a pair of bracket push arms each pivotally mounted on said beam at the forward arm end,
      (iii) a cross bar extending between said bracket arms at the rearward arm ends,
      (iv) a plurality of ripper teeth mounted in said cross bar for ripper action upon rearward tractor movement, (v) a cylinder and piston rod unit pivotally interconnected between said cross bar and said bracket to vary the degree of ground penetration of said ripper teeth, and (vi) an apertured lug on each of said bracket push arms adjacent the forward arm end, said lug upstanding from said bracket push arm to provide one pivot connection for a diagonal brace bar provided as part of a dozer blade when a dozer blade is mounted in place of said ripper teeth on said cross bar.

References Cited in the file of this patent

UNITED STATES PATENTS

| | | |
|---|---|---|
| 2,081,192 | Allin | May 25, 1937 |
| 2,140,105 | Cluster | Dec. 13, 1938 |
| 2,233,237 | Anderson | Feb. 25, 1941 |
| 2,311,553 | LeTourneau | Feb. 16, 1943 |
| 2,321,615 | Paulsen | June 15, 1943 |
| 2,371,549 | Sembler | Mar. 13, 1945 |
| 2,384,469 | Kalix | Sept. 11, 1945 |
| 2,396,739 | McCauley | Mar. 19, 1946 |
| 2,402,352 | Taylor | June 18, 1946 |
| 2,404,518 | Moran | July 23, 1946 |
| 2,444,321 | Woolridge | June 29, 1948 |
| 2,660,816 | Maxwell | Dec. 1, 1953 |
| 2,845,725 | Robishaw | Aug. 5, 1958 |

FOREIGN PATENTS

| | | |
|---|---|---|
| 202,979 | Australia | Aug. 9, 1956 |